United States Patent [19]

Stevens

[11] 4,416,748

[45] Nov. 22, 1983

[54] PROCESS FOR REDUCTION OF THE CONTENT OF $SO_2$ AND/OR $NO_x$ IN FLUE GAS

[75] Inventor: R. D. Samuel Stevens, Downsview, Canada

[73] Assignee: Concord Scientific Corporation, Downsview, Canada

[21] Appl. No.: 300,377

[22] Filed: Sep. 8, 1981

[51] Int. Cl.³ ........................ B01J 19/12; B01J 19/24
[52] U.S. Cl. ............................................. 204/157.1 P
[58] Field of Search ................................. 204/157.1 P

[56] References Cited

U.S. PATENT DOCUMENTS

| | | | |
|---|---|---|---|
| 1,221,505 | 4/1917 | Bradley et al. | 423/497 |
| 1,496,410 | 6/1924 | Doremus | 423/242 |
| 3,120,479 | 2/1964 | Dols et al. | 204/157.1 R |
| 3,389,971 | 6/1968 | Alliger | 23/277 |
| 3,840,342 | 10/1974 | Neti et al. | 204/157.1 R |
| 3,869,362 | 3/1975 | Machi et al. | 204/157.1 R |
| 4,076,606 | 2/1978 | Suzuki et al. | 204/157.1 R |
| 4,097,349 | 6/1978 | Zenty | 204/157.1 R |
| 4,146,450 | 3/1979 | Araki et al. | 204/157.1 R |
| 4,210,503 | 7/1980 | Confer | 204/157.1 R |
| 4,351,810 | 9/1982 | Martinez | 423/235 |

FOREIGN PATENT DOCUMENTS 2756186 2/1975 Fed. Rep. of Germany .

*Primary Examiner*—Howard S. Williams
*Attorney, Agent, or Firm*—Ridout & Maybee

[57] ABSTRACT

The content of $SO_2$ and/or $NO_x$ in flue gas is reduced by irradiating the flue gas in admixture with $NH_3$ with ultraviolet at wavelengths between 170 and 220 nm.

22 Claims, 3 Drawing Figures

PROCESS FOR REDUCTION OF THE CONTENT OF SO₂ AND/OR NOₓ IN FLUE GAS

The present invention relates to a process for the reduction of the content of $SO_2$ and/or the nitrogen oxides NO and $NO_2$ (sometimes referred to by the general term "$NO_x$") in flue gases.

It has been proposed to remove $NO_x$ from flue gases by mixing the gas with $NH_3$ and irradiating the mixture with ultraviolet light.

By this process, the $NH_3$ is photolysed to yield amino radical ($NH_2$) in accordance with the equation $$NH_3 \rightarrow NH_2 + H \tag{1}$$

The amino radical reacts with $NO_x$ to yield the inert gas nitrogen and $N_2O$ which is widely regarded as being inert and harmless in the atmosphere, in accordance with the equations $$NH_2 + NO \rightarrow N_2 + H_2O \tag{2}$$

$$NH_2 + NO_2 \rightarrow N_2O + H_2O \tag{3}$$

It has now been found that increased efficiency of the utilization of the ultraviolet light can be obtained when ultraviolet light of a wavelength falling within a selected range is employed. More specifically, the present invention provides, in one aspect, a process for reduction of the content of NO and $NO_2$ in flue gas, said flue gas containing also substantial quantities of $H_2O$ vapor, comprising mixing the flue gas with $NH_3$ and irradiating the mixture with ultraviolet radiation of wavelength about 190 to about 220 nm.

It will be appreciated that the efficiency of the utilization of the ultraviolet radiation is of economic significance. The process is of course usually to be applied to a flowing stream of the gas and if the irradiation is conducted with low efficiency, a prolonged exposure to the radiation is required. This would require that a bank of ultraviolet lamps of greatly extended length would need to be provided for irradiation of a prolonged section of the duct conveying the flue gas. The result would be that not only would there be an increase in the operating costs of supplying the energy required to energize the ultraviolet lamps, but also the capital cost of supplying and installing the irradiation apparatus would be considerably increased.

The dependency of the efficiency of the process on the wavelength of the ultraviolet light can best be demonstrated by employing a computer program simulating the photolysis reaction obtained from irradiation of the gas mixture with monochromatic light. The input information required for the formulation of such program is described in more detail hereinafter.

It has furthermore been found that by carrying out an irradiation at wavelengths in the range about 170 to about 190 nm, quantities of $SO_2$ can be efficiently converted to oxidized acidic species in flue gas streams also containing substantial quantities of water vapor and oxygen.

In accordance with a further aspect of the present invention there is accordingly provided a process for the conversion of the content of $SO_2$ in flue gas to oxidized acidic species, said flue gas containing also substantial quantities of $H_2O$ vapor and $O_2$, comprising irradiating the mixture with ultraviolet radiation of wavelength about 170 to about 190 nm.

When employing wavelengths in the range about 190 to about 220 nm, the main $NO_x$-removing reactions that occur are the above reactions (1), (2), and (3), resulting in the formation of $N_2O$, $H_2O$, and $N_2$ in the waste gas stream. It is considered that these products can be safely passed to the atmosphere. Substantial quantities of $SO_2$, if present in the flue gas, cannot be removed by irradiation of the mixture with light in the wavelength range about 190 to about 220 nm.

When the mixture is irradiated with light in the wavelength range about 170 to about 190 nm, $NO_x$ continues to be removed by amino radicals as a result of reactions (1), (2), and (3). Additionally, below about 190 nm there is considerable formation of OH radical due to photolysis of water vapor which is present as a matter of course in flue gas streams. Due to the high concentrations of water vapor normally present, the predominating reaction is therefore:

$$H_2O \rightarrow OH + H \tag{4}$$

The OH radical reacts with $SO_2$ and $NO_2$ to yield acidic species $$OH + SO_2 \rightarrow HSO_3 \tag{5}$$

$$OH + NO_2 \rightarrow HNO_3 \tag{6}$$

Normally, it would be desirable to remove these acidic species by absorption in the presence of moisture, e.g. water vapor, by an alkaline-reacting medium, e.g. by reaction with an excess of ammonia gas to yield the sulfate and nitrate salts $(NH_4)_2SO_4$ and $NH_4NO_3$. When the photolysed mixture is reacted with an alkaline-reacting medium in the vapor phase, the said sulfate and nitrate salts form a particulate second phase and normally it is desirable to remove the particulate salts from the gas stream before passing it to the atmosphere. In this case, particulate salts are obtained as a by-product. The particulate salts may be recovered and may have a value e.g. as fertilizer. $NH_4NO_3$ is, however, explosive and would present handling difficulties.

When the wavelength of the ultraviolet radiation employed in the irradiation step is in the range about 170 nm to about 220 nm, particularly in the range about 190 to about 220 nm, the $NH_3$ gas present in the mixture absorbs the radiation strongly, and a satisfactory removal of $NO_x$ and/or $SO_2$ (in the wavelength range 170 to 190 nm) is achieved as there is little interference from undesired side reactions. Above about 220 nm the efficiency of the process is impaired as the degree to which $NH_3$ absorbs radiation drops off sharply with wavelengths higher than about 220 nm and therefore only negligibly small concentrations of amino radical are generated, so that if the wavelength of the radiation is increased much above 220 nm the concentrations of ammonia that need to be employed, and the intensity of the radiation that is required, in order to achieve removal of $NO_x$ within reasonable times, rapidly becomes impracticably large.

The absorption of the radiation by $NH_3$ peaks at about 195 nm and drops off, as indicated in Table 1 toward wavelengths below about 170 nm. At the same time, however, as indicated in Table 1, the radiation is quite strongly absorbed by the $O_2$ and $H_2O$ which are usually present as a matter of course.

TABLE 1

| | Extinction coefficients ($1\ mol^{-1}\ cm^{-1}$) | | |
|---|---|---|---|
| | Wavelength (nm) | | |
| Reaction | 184.9 | 193 | 213.9 |
| $NH_3 + h\nu \rightarrow NH_2 + H$ | 1000 | 1500 | 100 |
| $O_2 + h\nu \rightarrow O\ (^3P)$ | 4.2 | 0.3 | 0.002 |
| $H_2O + h\nu \rightarrow OH + H$ | 14 | 0 | 0 |

The extinction coefficient $\epsilon$ is defined by $$I = I_0 10^{-\epsilon c l}$$

where
- $I_0$ = light intensity incident on a cell containing the photolysable species
- $I$ = intensity emerging from the cell
- $c$ = concentration of the photolysable species (mol $dm^{-3}$), and
- $l$ = cell length (cm)

The extinction coefficient therefore indicates how strongly the photolysable species absorbs the radiation, the higher the coefficient, the greater the degree of absorption.

It will be noted that above about 190 nm, the extinction coefficient of water vapor is zero and therefore substantially no OH radical is formed, so that reactions (5) and (6) do not occur to any significant extent.

Although the coefficients of $O_2$ and $H_2O$ are substantially lower than that of $NH_3$ in the range 170 to 220 nm, as may be perceived by the above Table, such coefficients increase sharply toward the lower end of the desired range and, moreover the concentrations of $O_2$ and $H_2O$ present in the reaction mixture are normally considerably higher than the concentration of $NH_3$. Desirably, in the process of the present invention the concentration of $NH_3$ present in the mixture that undergoes photolysis is in the range from about $5 \times 10^{-6}$ to about $5 \times 10^{-3}$ mol/l. With concentrations of $NH_3$ below about $5 \times 10^{-6}$ mol/l, the efficiency of the removal of $NO_x$ and/or $SO_2$ tends to be impaired and undesirably prolonged exposure to the ultraviolet radiation is required to achieve satisfactory degrees of removal of the undesired $NO_x$ and/or $SO_2$ material. Concentrations of $NH_3$ above about $5 \times 10^{-3}$ mol/l appear to be unnecessary in view of the efficiency of the process, and are undesirable as not only does the maintenance of high $NH_3$ concentrations in the photolysis reaction zone greatly increase the consumption of $NH_3$ and hence also the operating costs of the process, but also this may result in emission of substantial quantities of unconsumed $NH_3$ to the atmosphere. More preferably, the said concentration of $NH_3$ is in the range of about $1 \times 10^{-5}$ to about $1 \times 10^{-3}$ mol/l, still more preferably about $1 \times 10^{-5}$ to about $2 \times 10^{-5}$ mol/l.

The quantities of $O_2$ (moles) present in flue gases due to incomplete consumption of $O_2$ in the combustion air will however typically be about 40 times the molar concentrations of $NH_3$ which it is desired to maintain in the reaction mixture, and the quantities of $H_2O$ vapor present as a product of combustion will typically be of the order of about 80 times the said $NH_3$ molar concentrations. Therefore, at wavelengths much below about 170 nm, absorptions by $O_2$ and $H_2O$ compete significantly with the absorption by $NH_3$ as the concentration of $O_2$ and $H_2O$ is much higher than that of $NH_3$ and the extinction coefficients of $O_2$ and $H_2O$ increase rapidly while the extinction coefficient of $NH_3$ drops rapidly below about 170 nm, and therefore below 170 nm the formation of $NH_2$ radicals is greatly reduced.

As a result, when the ultraviolet radiation includes components with a wavelength below about 170 nm the efficiency of the utilization of the radiation energy is much reduced as a large proportion of the radiation energy is directed to the production of incompetent species. In the preferred form the ultraviolet radiation employed is substantially free from any component with a wavelength below about 170 nm.

Desirably, the said radiation includes at least one component with a wavelength in the range about 180 to about 270 nm. There is some tendency during the present reaction for combination of $NH_2$ radicals to occur, yielding hydrazine which is poisonous.

$$NH_2 + NH_2 \rightarrow N_2H_4$$

It is of course desirable to maintain the concentration of hydrazine in the reaction mixture leaving the photolysis reaction zone as low as possible, as it may otherwise be necessary to take special steps to absorb hydrazine from the reaction mixture.

Hydrazine is a strong absorber of radiation in the wavelength range about 180 to about 270 nm, and dissociates to re-form the amino radical

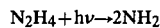

$$N_2H_4 + h\nu \rightarrow 2NH_2$$

By employing a source of ultraviolet light including one or more components in the wavelength range 180 to 270 nm, the content of hydrazine in the reaction mixture can be kept to acceptably low levels by its re-conversion to free $NH_2$ radicals.

The form of ultraviolet lamp to be employed will depend on the desired wavelength range. As noted above, in one form the lamp may preferably be one which is substantially free from any component wavelength below about 170 nm, and which desirably includes at least one component in the range about 180 to 270 nm. One class of lamps which may be employed comprises low pressure mercury arc lamps. These provide a strong emission line at 184.9 nm, along with a strong emission line at 253.7 nm, and weaker emissions at other wavelengths. A further class of lamps which may be employed consists of high pressure short arc mercury-xenon lamps. These provide an output which is a continuous spectrum from 190 nm to above 300 nm and no emission at any wavelength lower than 190 nm. These lamps are therefore particularly useful for photolytic removal of $NO_x$ from flue gas streams by irradiation of the reaction mixture at 190 to 220 nm. However, a substantial proportion of their output consists of radiation with a wavelength above 220 nm.

It may be noted that the above-mentioned low pressure mercury arc lamps and high pressure short arc mercury-xenon lamps are readily available commercially. It is one advantage of the present process that it can be carried out employing readily commercially-available ultraviolet lamps.

Some examples of processes in accordance with the present invention are illustrated in the accompanying drawings in which.

Figure 1:
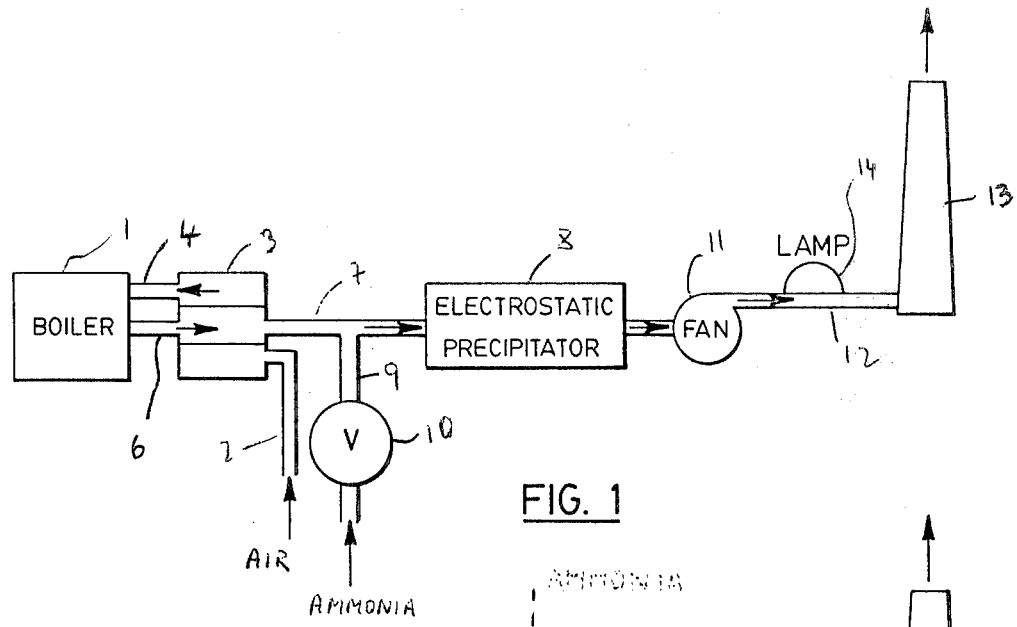
FIG. 1 shows in schematic form the lay-out of combustion apparatus e.g. a boiler, and associated equipment for removal of $NO_x$ and/or $SO_2$ from the flue gases emitted by the boiler.

Referring to the drawings, FIG. 1 shows a combustion apparatus e.g. a boiler 1, which is supplied with combustion air through an inlet line 2 which passes through an air preheater 3 from which the heated air is supplied to the boiler through a line 4. Flue gases from the boiler pass direct to the preheater 3 through a duct 6.

The boiler 1 may be in general any form of combustion apparatus wherein atmospheric air is employed to sustain combustion and the fuel contains sulfur, yielding $SO_2$ in the flue gas, and/or the fuel is burnt at a temperature sufficiently high that a substantial quantity of $NO_x$ is formed. At high temperatures nitrogen, present in the combustion air and, particularly in the case of solid fuels, bound up in the fuel itself, and oxygen, present in the combustion air, react together to yield NO.

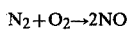
$$N_2 + O_2 \rightarrow 2NO$$

Some oxidation of NO to $NO_2$ also occurs, so that the flue gases containing NO mixed with some $NO_2$

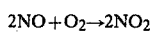
$$2NO + O_2 \rightarrow 2NO_2$$

The fuel may therefore be, for example, hydrogen gas, or a primarily carbonaceous or hydrocarbon fuel, e.g. the socalled fossil fuels such as oil, coal, and natural gas, or a fuel derived from fossil fuels e.g. petroleum gas or coal gas.

Ammonia gas is injected into a duct 7 which conveys the cooled flue gas from the air preheater 3 to the usual device for separation of particulate material e.g. fly ash from the gas stream, in this example an electrostatic precipitator 8. The ammonia is injected through an inlet line 9 under the control of a valve 10 which permits addition of the ammonia at a metered rate. Frequently, the flue gas will contain quantities of $SO_3$ and HCl. These react with $NH_3$ to yield particulate ammonium salts, e.g. $NH_4HSO_4$ and $NH_4Cl$. If the ammonia is added downstream from the boiler or other combustion apparatus 1 and the air preheater 2, there is no risk of ammonium bisulfate and ammonium chloride condensing on critical components such as the boiler 1 and preheater 2 and causing corrosion and fouling. The ammonia may be added as indicated upstream from the precipitator 8 so that the bisulfate salt can be removed to avoid excessive turbidity in the gas stream and loss of efficiency in the subsequent photolysis step. The rate of addition of ammonia may be calculated so that there is sufficient to react with the $SO_3$ and HCL and leave an excess of ammonia over in the concentration required during the photolysis step i.e. generally in the above-mentioned range of about $5 \times 10^{-6}$ to about $5 \times 10^{-3}$ mol/l. Alternatively, and more desirably, the rate of addition of $NH_3$ may be controlled automatically in response to sensors located in the duct 7 and in the stack 13, the former sensors being responsive to the concentrations of $SO_2$ and/or $NO_x$ and serving to increase the rate of addition of $NH_3$ as the concentrations of $SO_2$ and/or $NO_x$ increase and the latter sensors being responsive to the presence of $NH_3$ and serving to decrease the rate of addition of $NH_3$ when the concentration of unconsumed $NH_3$ in the stack gases rise above a predetermined limit.

A ammonium bisulfate and chloride mixture collected at the precipitation may be separated from ash and be recovered and particularly if, depending on the chemical composition of the flue gas, it does not contain excessive quantities of heavy metals or other toxic materials, may be utilizable as a valuable by-product.

Figure 2:
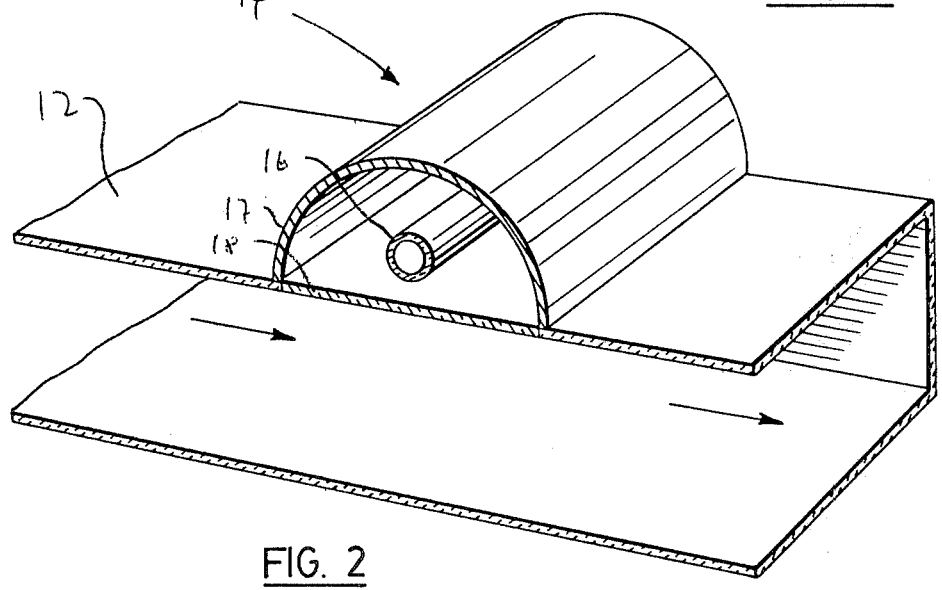
FIG. 2 is a perspective view illustrating a longitudinal section through a portion of the wall of the flue gas duct of the above apparatus.

As shown, the ammonia addition is desirably made at a point upstream from the usual induced draft fan 11 which passes the cleaned gas from the precipitator 8 along a duct 12 to the stack 13 from which the flue gases are vented to the atmosphere. Passage of the flue gas/$NH_3$ mixture through the fan 11 ensures that the $NH_3$ is mixed uniformly in the gas stream. It is an advantage of the process of the invention that the ammonia can be introduced and the photolysis conducted at a region of the flue gas ductwork adjacent the electrostatic precipitators where the flue gases are at comparatively low temperature e.g. up to 400° C., more typically 150° to 250° C., as high temperatures are not required for the photolytic generation of the reactive $NH_2$ and OH radicals, which can proceed in the cold. These regions of the flue gas ductwork are normally readily accessible so the fitting of the inlets, lamps etc. required for carrying out the process can be readily carried out on existing combustion plant. A lamp 14 is provided adjacent the duct 12 for irradiating the gas stream passing through the duct 12. As shown in FIG. 2, the lamp may comprise a lamp body proper 16 housed within a metal reflector 17 and separated from the interior of the duct by an ultraviolet-transmissive window 18 e.g. of quartz. Desirably the space within the reflector 17 and window 18 comprise a sealed unit filled with an ultraviolet-inert gas e.g. nitrogen to avoid absorption losses to avoid or reduce generation of ozone in the atmosphere adjacent the lamp. It is desirable to mount the lamp 14 external to the duct 12, as shown, because the flue gas will normally contain significant amounts of particulate matter even after passage through the precipitator 8 and there may therefore be a risk of fouling of the lamp structure. Normally, it will be desirable to equip the window 18 with automated mechanical cleaners (not shown) to remove any fouling which may build up on the face of the window adjacent the interior of the duct 12.

As noted above, the efficiency of the removal of the $NO_x$ and/or $SO_2$ is strongly dependent on the wavelength of the ultraviolet radiation employed. It has been found, however, that the efficiency of the process when operated in the selected wavelength range, in terms of the rate of removal of the undesired species is relatively insensitive to the concentrations of other species present in the reaction mixture. It is convenient to measure the effectiveness of the process in removing $NO_x$ in terms of the percentage removal of NO. Thus, for example when a reaction mixture consisting of a given flue gas composition and $NH_3$ is irradiated with ultraviolet light of wavelength 184.9 nm, the rate of reduction of NO content is approximately twice the rate that is achieved when the irradiation is conducted at a wavelength of 193 nm, and is more than 5 times the rate of reduction of NO obtained at 213.9 nm. These rates are relatively unaffected by the initial concentration of NO, $SO_2$ or $NH_3$ (as long as a certain minimum concentration of $NH_3$ is present), or by variation in the concentration of any other species normally present in the reaction mixture, and given that the usual quantities of $H_2O$ vapor (normally at least about $1 \times 10^{-4}$ mol/l) are present in the flue gas. The rate of reduction of $NO_x$ and/or $SO_2$ is also dependent on the total quantity of radiant energy to which the reaction mixture is subjected. Thus for example when the $NH_3$ and flue gas mixture is irradiated with ultraviolet light in the preferred wavelength range of 170 to 190 nm about 80% of the $NO_x$ is removed when the mixture is irradiated continuously for 10 millisec at a light intensity of about $10^{20}$ photon/cm$^2$/sec, or is irradiated continuously for 100 millisec at an intensity of about $10^{19}$ photon/cm$^2$/sec, these light intensities being typical of those achievable with the preferred forms of ultraviolet lamps. Typically the flow rate of flue gases through the normal uniform cross-section ductwork encountered in e.g. conventional coal-fired power stations is of the order of 10 m/sec, thus requiring that the irradiated lengths of ductwork should be of the order of 10 cm in the case of the higher powered lamps or 1 m in the case of the lower powered lamps. The percentage reductions of $NO_x$ that will be required in any given case will of course depend on the initial concentrations of $NO_x$ present in the flue gas and the levels of $NO_x$ concentration that it is desired to achieve in stack gas passed to the atmosphere but usually percentage reductions of at least 80% in the $NO_x$ concentration will be called for. As noted above when higher wavelengths in the range of 190 to 220 nm are employed, the rate of removal of $NO_x$ is slower by a factor of about 5. More generally, therefore it will normally be desired to subject the reaction mixture to a total quantity of radiant energy flux in range of about $10^{18}$ to about $10^{19}$ photon/cm$^2$ of the irradiated area of the flue gas duct during the photolysis reaction.

Under the same conditions, the rate of removal of $SO_2$, whether in the presence of $NO_x$ or in the absence of $NO_x$, is about 4 or 5 times slower than the rate of removal of $NO_x$ in the preferred wavelength range of 170 to 190 nm. Accordingly in the case of removal of $SO_2$ from the flue gas stream it will normally be desirable to subject the reaction mixture to a total radiant energy flux of about $5 \times 10^{18}$ to about $5 \times 10^{19}$ photon/cm$^2$ of the irradiated area of the flue gas duct.

The embodiment illustrated in FIG. 1 is particularly well suited for use when either it is desired to control only emission of $NO_x$, and the irradiation is conducted at a wavelength of 190 to 220 nm so that the gaseous photolysis products $N_2$ and $N_2O$ may be vented through the stack 13, or when the object is to control emissions of solely $SO_2$ or both $SO_2$ and $NO_x$ and the irradiation is conducted at a wavelength of 170 to 190 nm and it is acceptable to vent particulate photolysis products e.g. $(NH_4)_2SO_4$ and $NH_4NO_3$ to the atmosphere.

Figure 1A:
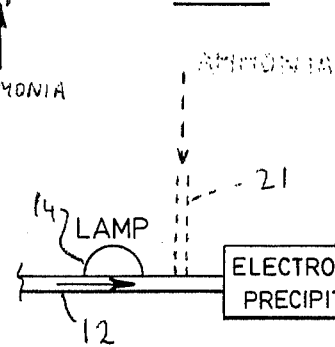
FIG. 1a shows a modification of the apparatus of FIG. 1.

In the embodiment of FIG. 1a, after irradiation at the lamp 14 with ultraviolet light in the wavelength range 170 to 190 nm, which results in the generation of the acidic bodies $H_2SO_4$ and $HNO_3$ through reactions (5) and (6) above, and their subsequent neutralization to form particulate $(NH_4)_2SO_4$ and $NHNO_3$ through reaction with an excess of ammonia, the reaction mixture is passed through a second solids separator device e.g. a second electrostatic precipitator 19 wherein the particulate products are removed. Depending on the chemical composition of flue gases, and particularly if the flue gases are free from toxic heavy metal materials, the separated-out sulfate and nitrate salts may be recovered e.g. for use as agricultural fertilizer. Instead of supplying an excess of ammonia to the flue gas before the irradiation step it will normally be more efficient to supply the additional ammonia required for neutralization of the acidic bodies through an auxiliary ammonia inlet subsequent to the lamp 14 and as indicated in broken lines at 21, under the control of the sensors in the stack 13 which control the emission of unreacted ammonia to the atmosphere.

As mentioned briefly above, the optimum conditions required for the photolysis reaction for any given flue gas composition and, in particular the duration of the exposure to the ultraviolet radiation and hence the length of ductwork that needs to be irradiated for any given source of ultraviolet radiation, can best be investigated by conducting a computer simulation of the photolysis reaction when conducted with a monochromatic source. Such computer simulation requires the provision of a set of parameters that comprise the input to the computer program. These comprise a set of initial concentrations of all reactive chemical species present in the flue gas, and the extinction coefficients applicable to the wavelength under investigation for the photolysis reactions of all photolysable species present in the gas mixture. For the avoidance of doubt, these extinction coefficients are set out in Table 2 below for certain selected wavelengths. Other coefficients applicable to different wavelengths can be readily obtained from standard texts.

TABLE 2

| | Photolysis Reactions | | |
|---|---|---|---|
| | Extinction coeff./1 mol$^{-1}$ cm$^{-1}$ | | |
| Reaction | 184.9 nm | 193 nm | 213.9 nm |
| $NH_3 + h\nu \rightarrow NH_2 + H$ | 1000 | 1500 | 100 |
| $SO_2 + h\nu \rightarrow SO + O (^3P)$ | 172 | 1000 | 150 |
| $H_2O + h\nu \rightarrow OH + H$ | 14 | 0 | 0 |
| $O_3 + h\nu \rightarrow O_2 + O ('D)$ | 156 | 100 | 150 |
| $O_2 + h\nu \rightarrow 2O (^3P)$ | 4.2 | 0.3 | 0.002 |
| $NO_2 + h\nu \rightarrow NO + O (^3P)$ | 68 | 68 | 100 |
| $N_2O + h\nu \rightarrow N_2 + O ('D)$ | 36 | 35 | <1 |
| $N_2H_4 + h\nu \rightarrow 2 NH_2$ | 850 | 1000 | 600 |

Further, the parameters include the intensity of the irradiation, and the rate constants of the significant chemical reactions that occur during the photolysis reaction. As a result of extensive study of the chemistry of the reaction, 52 chemical reactions have been identified as being significant exclusively, and these are listed in Table 3 along with their respective rate constants.

TABLE 3

| Reactions | Rate Constant (dm$^3$ mol$^{-1}$ s$^{-1}$) |
|---|---|
| 1. $NH_2 + NO = N_2 + H_2O$ | $1.3 \times 10^{10}$ |
| 2. $NH_2 + NO_2 = N_2O + H_2O$ | $1.3 \times 10^{10}$ |
| 3. $NH_2 + NH_2 = N_2H_4$ | $1.5 \times 10^{10}$ |
| 4. $NH_2 + O_2 = NO + H_2O$ | $1.2 \times 10^3$ |
| 5. $NH_2 + RH = NH_3 + R$ | $5.0 \times 10^4$ |
| 6. $NH_2 + H = NH_3$ | $1.0 \times 10^{11}$ |
| 7. $NH_2 + H_2 = NH_3 + H$ | $8.7 \times 10^2$ |
| 8. $NH_2 + O = HNO + H$ OR $HO + NH$ | $2.1 \times 10^9$ |
| 9. $NH_2 + OH = HNO + H_2$ OR $NH + H_2O$ | $6.0 \times 10^7$ |
| 10. $NH_2 + HO_2 = HNO + H_2O$ | $2.0 \times 10^8$ |
| 11. $NH_3 + H = NH_2 + H_2$ | $3.0 \times 10^8$ |
| 12. $NH_3 + OH = NH_2 + H_2O$ | $1.0 \times 10^8$ |
| 13. $NH_3 + O = NH_2 + OH$ | $4.0 \times 10^5$ |
| 14. $O + NO_2 = O_2 + NO$ | $5.6 \times 10^9$ |
| 15. $O + O_2 = O_3$ | $8.7 \times 10^6$ |
| 16. $O + NO = NO_2$ | $9.9 \times 10^8$ |
| 17. $NO + O_3 = NO_2 + O_2$ | $1.0 \times 10^7$ |
| 18. $O ('D) + H_2O = 2 OH$ | $1.3 \times 10^{11}$ |
| 19. $O ('D) (+M) = O (^3P) (+M)$ | $8.2 \times 10^8$ s$^{-1}$ at 1 Atm. |
| 20. $H + O_2 = HO_2$ | $8.0 \times 10^8$ |

TABLE 3-continued

| Reactions | Rate Constant (dm$^3$ mol$^{-1}$ s$^{-1}$) |
|---|---|
| 21. $HO_2 + NO = NO_2 + OH$ | $5.0 \times 10^9$ |
| 22. $O + SO = SO_2$ | $5.0 \times 10^7$ |
| 23. $O_2 + SO = SO_2 + O\ (^3P)$ | $5.0 \times 10^4$ |
| 24. $O_3 + SO = SO_2 + O_2$ | $4.5 \times 10^7$ |
| 25. $SO + SO = SO_2 + S\ OR\ (SO)_2$ | $2.0 \times 10^6$ |
| 26. $OH + OH = H_2O + O\ (^3P)$ | $1.1 \times 10^9$ |
| 27. $OH + NO_2 = HNO_3$ | $3.8 \times 10^{10}$ |
| 28. $O + O_3 = 2O_2$ | $5.7 \times 6$ |
| 29. $OH + CO = CO_2 + H$ | $9.0 \times 10^7$ |
| 30. $SO + NO_2 = SO_2 + NO$ | $8.5 \times 10^9$ |
| 31. $H + HO_2 = H_2 + O_2$ | $8.4 \times 10^9$ |
| $= 2OH$ | $1.9 \times 10^{10}$ |
| $= H_2O + O$ | $5.7 \times 10^8$ |
| 32. $O + OH = O_2 + H$ | $2.3 \times 10^{10}$ |
| 33. $OH + HO_2 = H_2O + O_2$ | $2.1 \times 10^{10}$ |
| 34. $HO_2 + HO_2 = H_2O_2 + O_2$ | $1.4 \times 10^9$ |
| 35. $O_3 + OH = HO_2 + O_2$ | $4.9 \times 10^7$ |
| 36. $O_3 + HO_2 = OH + O_2$ | $1.2 \times 10^6$ |
| 37. $OH + SO_2 = HSO_3$ | $6.6 \times 10^8$ |
| 38. $H + O_3 = OH + O_2$ | $1.7 \times 10^{10}$ |
| 39. $O + H_2O = OH + O_2$ | $1.9 \times 10^{10}$ |
| 40. $O + O = O_2$ | $6.9 \times 10^7$ |
| 41. $O + H = OH$ | $2.9 \times 10^8$ |
| 42. $H_2 + O = OH + H$ | $4.0 \times 10^3$ |
| 43. $SO_2 + O = SO_3$ | $1.1 \times 10^7$ |
| 44. $O + CO = CO_2$ | $3.0 \times 10^4$ |
| 45. $N_2H_4 + H = N_2H_3 + H_2$ | $1.1 \times 10^8$ |
| 46. $OH + H = H_2O$ | $7.2 \times 10^9$ |
| 47. $OH + H_2 = H_2O + H$ | $3.9 \times 10^6$ |
| 48. $SO_2 + HO_2 = SO_3 + OH$ | $5.4 \times 10^5$ |
| 49. $O + NO = N + O_2$ | $7.7 \times 10^4$ |
| 50. $NO + H = HNO$ | $8.3 \times 10^8$ |
| 51. $NO_2 + H = NO + OH$ | $7.5 \times 10^{10}$ |
| 52. Free radical → wall termination | $7.5 \times 10^{-2}$ |

Note
1: Many of these reactions are third order at atmospheric pressure. A pseudo-second order rate constant is quoted, and was obtained by substituting one atmosphere pressure for the third body.
2: In practice, wall termination was applied only to $NH_2$ radicals to ensure a conservative result.

Certain of the rate constants and extinction coefficients specified in Tables 2 and 3 are subject to slight uncertainties owing to conflicting reports in the literature, notably in the extinction coefficients of $NH_3$, $O_2$, $H_2O$, and $SO_2$ and in the rate constants of reactions numbered (1) and (2) in Table 3. The effect of these uncertainties can however be readily checked by varying the input parameters in the computer program and their effect on the resultant rates of NO removal has been found to be very small or negligible.

As will be apparent to those skilled in the art, the set of fifteen rate equations, one for each of the species $NH_2$, $NH_3$, O, NO, O('D), H, $HO_2$, O, $O_2$, $O_3$, SO, OH, $SO_2$, $N_2H_4$, and (free radical→termination) described by the 52 reactions of Table 3 constitute a stiff system of differential equations, because the rate constants cover a wide range of values. These equations may be integrated numerically using conventional methods e.g. as described in "The automatic integration of ordinary differential equations" Gear C. W., Common ACM, 14, P176 (1971). It should be noted that computer time can be reduced, and the stability of the solution improved, by using units of micromoles and microseconds rather than moles and seconds. This results in concentrations and rates whose numerical magnitudes are such that round-off errors are less important than they would be if more conventional units are employed.

As will be appreciated the solutions obtained from the procedure provide the instantaneous concentrations of any selected species at any selected time during the course of the photolysis reaction, and the analysis may be applied to all flue gases obtained from conventional combustion processes including, as mentioned above, the combustion at high temperatures in the presence of air of fuels as diverse as hydrogen gas, fossil fuels and fuels which are derivatives of fossil fuels, which flue gases contain substantial quantities of $SO_2$ and/or $NO_x$, typically $1 \times 10^{-6}$ to $1 \times 10^{-4}$ mol/l $SO_2$, $1 \times 10^{-7}$ to $1 \times 10^{-5}$ mol/l $NO_2$ and $1 \times 10^{-6}$ to $1 \times 10^{-4}$ mol/l NO.

Usually the concentrations of the species present in such fuel gases will be as indicated in Table 4.

TABLE 4

| Species | Concentration Range mol/l |
|---|---|
| $SO_3$ | 0 to $1 \times 10^{-6}$ |
| $SO_2$ | 0 to $1 \times 10^{-4}$ |
| $NO_2$ | 0 to $1 \times 10^{-5}$ |
| $N_2O$ | 0 to $1 \times 10^{-7}$ |
| NO | 0 to $1 \times 10^{-4}$ |
| HCl | 0 to $1 \times 10^{-5}$ |
| OH | $1 \times 10^{-4}$ to $1 \times 10^{-12}$ |
| $H_2O$ | $1 \times 10^{-4}$ to $1 \times 10^{-2}$ |
| $O_2$ | $1 \times 10^{-4}$ to $1 \times 10^{-2}$ |
| RH (hydrocarbons) | 0 to $1 \times 10^{-6}$ |
| CO | $1 \times 10^{-7}$ to $1 \times 10^{-5}$ |
| $CO_2$ | $1 \times 10^{-4}$ to $1 \times 10^{-2}$ |
| Others (mainly nitrogen) | balance |

Merely by way of example a typical fuel gas composition as obtained from a coal-fired power station is given in Table 5 (reactive species only).

TABLE 5

| Species | Concentration |
|---|---|
| $O_2$ | 3½ to 9% by volume (full to part load) |
| $H_2O$ | 10% by volume |
| NO | 300–700 ppm (vol) |
| $SO_2$ | 1100–1600 ppm (vol) |
| HCl | 100 ppm (vol) |
| $SO_3$ | 10–16 ppm (vol) |
| $NO_2$ | 30–70 ppm (vol) |

I claim:

1. Process for reduction of the content of NO and $NO_2$ in flue gas containing also substantial quantities of $H_2O$ vapor comprising mixing the flue gas with $NH_3$ and irradiating the mixture with ultraviolet radiation of wavelength at least as great as about 190 nm and containing at least one component of wavelength in the range from about 190 to about 220 nm, said radiation being substantially wholly free of any component with a wavelength below about 190 nm, and said process taking place in the absence of a solid state catalyst.

2. Process as claimed in claim 1 wherein said radiation is provided from a high pressure short arc mercury-xenon lamp providing a continuous spectrum output from 190 nm to above 300 nm.

3. Process as claimed in claim 1 wherein the gaseous mixture after irradiation is passed direct to the atmosphere.

4. Process as claimed in claim 1 wherein the gaseous mixture is subjected to a total quantity of radiant energy flux of radiation in said wavelength range of from about $10^{18}$ to $10^{19}$ photon/cm$^2$ of the irradiated area.

5. Process as claimed in claim 1 wherein said mixture contains about $5 \times 10^{-6}$ to about $5 \times 10^{-3}$ mol/l $NH_3$.

6. Process as claimed in claim 5 wherein said $NH_3$ content is about $1 \times 10^{-5}$ to about $1 \times 10^{-3}$ mol/l.

7. Process as claimed in claim 6 wherein said content is about $1 \times 10^{-5}$ to about $2 \times 10^{-5}$ mol/l.

8. Process as claimed in claim 1 wherein the $NH_3$ is added to the flue gas when the latter is at a temperature of up to about 400° C.

9. Process as claimed in claim 8 wherein said temperature is about 150° to about 250° C.

10. Process as claimed in claim 1 in which the gas is a flue gas containing at least about $1 \times 10^{-6}$ mol/l $SO_2$.

11. Process as claimed in claim 10 in which the gas contains about $1 \times 10^{-6}$ to about $1 \times 10^{-4}$ mol/l $SO_2$.

12. Process as claimed in claim 10 in which the gas contains about 1100 to 1600 ppm $SO_2$.

13. Process for reacting a flue gas containing at least about $1 \times 10^{-6}$ mol/l $SO_2$ to convert said $SO_2$ to an oxidized acidic species, in the absence of a solid state catalyst, said flue gas containing also substantial quantities of $H_2O$ vapor and $O_2$, comprising irradiating the gas with ultraviolet radiation nm.

14. Process as claimed in claim 13 wherein the content of $SO_2$ in the gas is about $1 \times 10^{-6}$ to about $1 \times 10^{-4}$ mol/l.

15. Process as claimed in claim 13 wherein said radiation is from a low pressure mercury arc lamp providing strong emission lines at 184.9 and 253.7 nm.

16. Process as claimed in claim 13 wherein said gaseous mixture is subjected to a total quantity of radiant energy flux of radiation in said wavelength range of from about $5 \times 10^{18}$ to about $5 \times 10^{19}$ photon/cm² of the irradiated area.

17. Process as claimed in claim 13 including contacting the irradiated mixture with an alkaline-reacting medium to absorb acid species.

18. Process as claimed in claim 13 including contacting the irradiated mixture with gaseous ammonia to absorb acid species.

19. Process as claimed in claim 1 or 13 wherein said flue gas contains $1 \times 10^{-4}$ to $1 \times 10^{-2}$ mol/l $H_2O$ vapor and $1 \times 10^{-6}$ to $1 \times 10^{-2}$ mol/l $O_2$.

20. Process as claimed in claim 1 or 13 wherein said flue gas contains no more than $1 \times 10^{-8}$ mol/l hydrocarbons.

21. Process as claimed in claim 13 wherein the radiation contains a component in the range about 170 to about 190 nm.

22. Process for reduction of the content of NO and $NO_2$ in flue gas containing also substantial quantities of $H_2O$ vapor, comprising mixing the flue gas with $NH_3$ blowing the mixture containing $NH_3$ through a fan to an irradiation site, and irradiating the mixture at the irradiation site with ultraviolet radiation of wavelength at least as great as about 190 nm and containing at least one component of wavelength in the range from about 190 to about 220 nm, said radiation being substantially wholly free of any component with a wavelength below about 190 nm, and said process taking place in the absence of a solid state catalyst.

* * * * *